No. 12,005. Reissued July 1, 1902.

A. LEVISON.

MANIFOLD BOOK.

(Application filed Mar. 13, 1902.)

WITNESSES:
Oscar Thure Larsen.
Bessie Gorfinkel

INVENTOR.
Alexander Levison
BY
Francis M. Wright
ATTORNEY.

NORRIS PETERS INC. LITHO. WASHINGTON D. C.

UNITED STATES PATENT OFFICE.

ALEXANDER LEVISON, OF SAN FRANCISCO, CALIFORNIA.

MANIFOLD-BOOK.

SPECIFICATION forming part of Reissued Letters Patent No. 12,005, dated July 1, 1902.

Original No. 694,103, dated February 25, 1902. Application for reissue filed March 13, 1902. Serial No. 98,113.

*To all whom it may concern:*

Be it known that I, ALEXANDER LEVISON, a citizen of the United States, residing at San Francisco, in the county of San Francisco and State of California, have invented certain new and useful Improvements in Manifold-Books, of which the following is a specification.

My invention relates to an improved manifold receipt and record book for mercantile, railway, express, or other business uses.

The object of my invention is to provide a book of this character which shall be convenient in use, economical in the number of carbons required, which shall give secure protection against alterations and forgeries, and the sheets of which can be readily and conveniently placed on record after the impression has been taken.

My invention therefore resides in the novel construction, combination, and arrangement of parts for the above ends hereinafter fully specified, and particularly pointed out in the claims.

Figure 1:
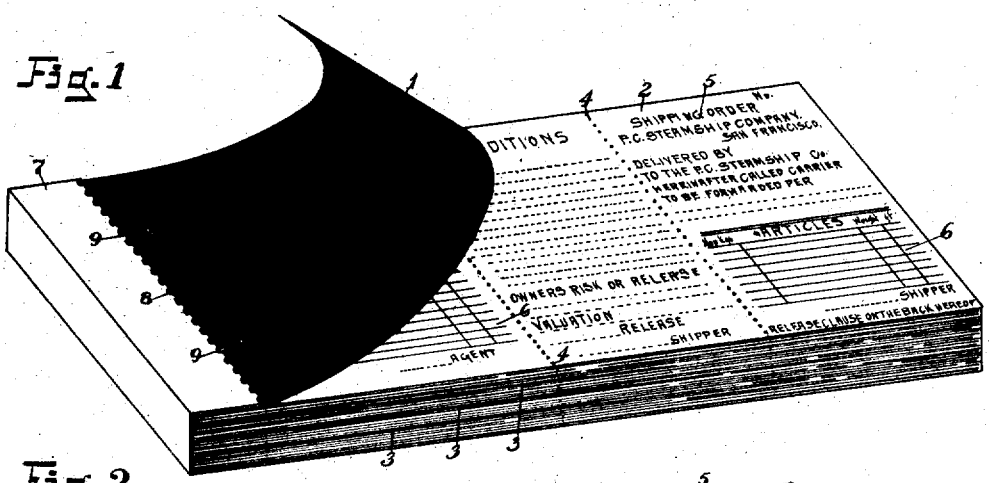
Figure 2:
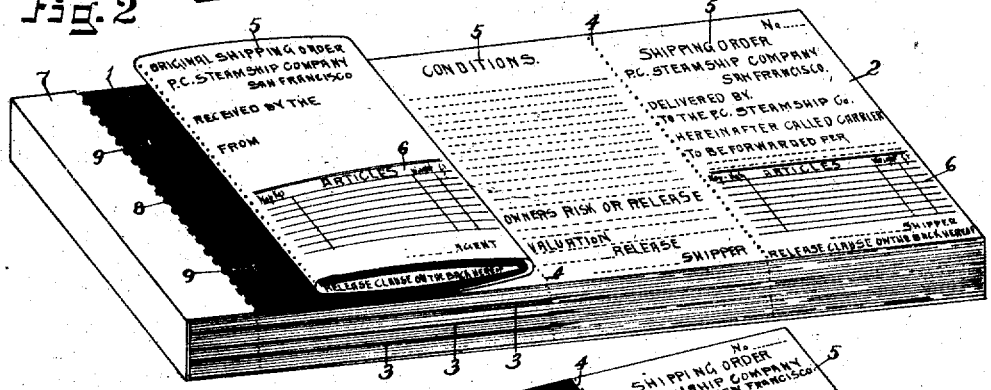
Figure 3:
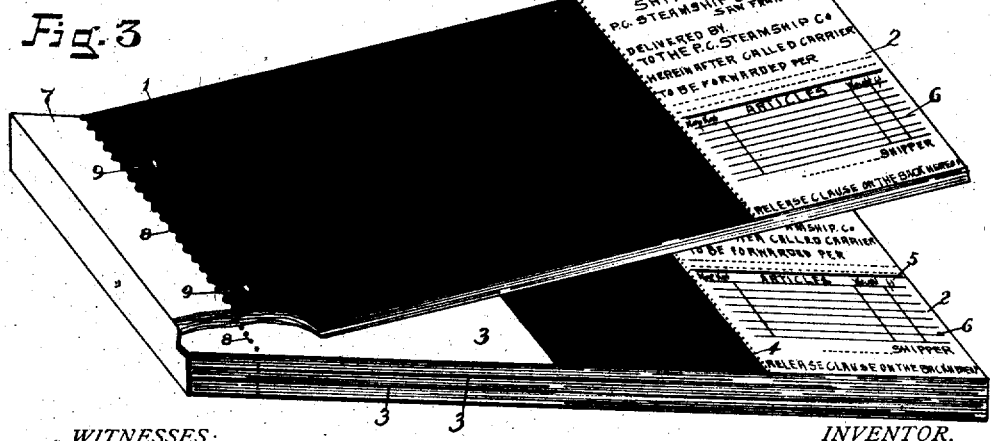

In the accompanying drawings, Figure 1 is a perspective view of one of my improved manifold-books before use. Fig. 2 is a similar view showing the position when folded for use; and Fig. 3 is a perspective view of the book, a number of sheets being turned up and the book being broken away to show a cardboard backing and carbon-paper.

Referring to the drawings, it will be seen that my improved manifold-book is formed in sections, each section comprising in order, first, a carbon-sheet 1, of about two-thirds the width of the book, then below said carbon-sheet 1 a number of sheets 2, of ordinary paper, the full width of the book, then a sheet 3 of hard thick cardboard. Each record-sheet outside the stub 7 is divided into three substantially equal parts by vertical lines of perforations 4, said parts having suitable printed matter 5 and blank lines 6, whereon to inscribe the desired record. The carbon-sheets 1 are of sufficient width to extend over two of said parts, while the cardboard backing 3 occupies the width of the inner parts only of the sheets above it. The record-sheets and the cardboard backings are attached to stubs 7 along lines of perforations 8, so that they can be readily detached from said stubs, and said stubs and one side of each carbon-sheet are all bound together to form a book.

In use the record-sheet is first folded on the outer line of perforations 4, so as to cover about one-half of the carbon-sheet, and it is then folded in the same direction on the second line of perforations, so that the carbon is now folded inside of the record-sheet, as shown in Fig. 2. The record will now be written upon what was the back of the middle portion of the sheet when it was flat and unfolded, which will now, however, have come to the top. The carbon-sheet is double or carbonized on both sides, so that a copy of the record will be made upon each of the two terminal parts of the sheet. Also an inverted or backhanded copy of the writing will be formed upon the back of each part, except the inner one. This latter feature gives additional security against subsequent alteration of the record, since it is difficult to erase and rewrite both the original and the reverse copy.

The use of the cardboard backing is to provide a hard substance to form a smooth writing-surface and also to protect the carbon-paper and sheets below it from receiving an impression written upon a sheet above said backing. The inner edge of the inner part of the record-sheet is punched with two holes 9 to facilitate the filing of said part.

It has been already stated that the three separable parts of each recording-sheet are substantially equal. They are not exactly equal, since it is preferable to provide the innermost part with an unprinted additional space or margin next the stub through which are punched the holes 9 to facilitate the filing of said part. Moreover, it is better to leave a small space between the edge of the sheet when folded and the line of perforations 8, as this renders it easier to fold the parts. With this exception the separable parts of each recording-sheet are of the same size and in general will contain identical printed matter thereon.

The advantages of the above construction are that any kind of paper can be used for the record-sheets, and the construction does not require any transparent paper. The carbon naturally falls into the position for use for the next record-sheet when one record-sheet has been removed and the record-sheet is very readily folded in the desired manner, the fold being twice in the same direction. The device is economical of carbon-paper.

The cardboard backings are an important feature of my invention, since they permit a large number of sheets to be bound into a book with a small number of carbons without any danger of transmitting an impression from one sheet to another sheet. They are readily removable by means of the lines of perforations when all the sheets above them have been used.

I claim—

1. A manifold-book composed of sections, each section comprising in order a double carbon-sheet, a plurality of recording-sheets, and a cardboard backing, the record-sheets outside the stubs being divided into three substantially equal separable parts, the carbon-sheets extending the width of two of said parts, and the cardboard backing extending the width of one of said parts, said recording-sheets and backings having stubs to which they are attached along lines of perforations, said stubs and one side of each carbon-sheet being all bound together to form a book, substantially as described.

2. A manifold-book comprising in order a double carbon-sheet, a plurality of recording-sheets, and a cardboard backing, the record-sheets outside the stubs being divided into three substantially equal separable parts, and the carbon-sheet extending the width of two of said parts, said recording-sheets having stubs to which they are attached along lines of perforations, said stubs and one side of the carbon-sheet and backing being all bound together to form a book, substantially as described.

3. A manifold-book comprising in order a double carbon-sheet, and a plurality of recording-sheets, the record-sheets outside the stubs being divided into three substantially equal separable parts, and the carbon-sheet extending the width of two of said parts, said recording-sheets having stubs to which they are attached along lines of perforations, said stubs and one side of the carbon-sheet being all bound together to form a book, substantially as described.

4. A manifold-book comprising in order a double carbon-sheet, and a plurality of recording-sheets, each of said sheets outside the stubs being divided into a plurality, not less than three, of substantially equal separable parts, and the carbon-sheet extending the width of said parts except the outermost, said recording-sheets having stubs to which they are attached along lines of perforations, said stubs and one side of the carbon-sheet being all bound together to form a book, substantially as described.

5. A manifold-book comprising in order a double carbon-sheet, and a plurality of recording-sheets, each recording-sheet outside the stub being divided into a plurality not less than three of separable parts joined along lines of perforations, each part being not greater than the part next it on the side toward the stub, and the carbon-sheet extending the width of the whole of said parts except the outermost, said recording-sheet having stubs to which they are attached along lines of perforations, said stubs and one side of the carbon-sheet being all bound together to form a book, substantially as described.

A. LEVISON.

Witnesses:
FRANCIS M. WRIGHT,
BESSIE GORFINKEL.